US012784999B2

(12) United States Patent
Matsushita et al.

(10) Patent No.: US 12,784,999 B2
(45) Date of Patent: Nov. 3, 2026

(54) CARBONACEOUS MATERIAL, METHOD FOR PRODUCING SAME, ELECTRODE ACTIVE MATERIAL FOR ELECTRIC DOUBLE LAYER CAPACITORS, ELECTRODE FOR ELECTRIC DOUBLE LAYER CAPACITORS, AND ELECTRIC DOUBLE LAYER CAPACITOR

(71) Applicant: KURARAY CO., LTD., Kurashiki (JP)

(72) Inventors: Minoru Matsushita, Bizen (JP); Mitsunori Hitomi, Bizen (JP); Shushi Nishimura, Bizen (JP); Hiroyuki Nishinami, Bizen (JP); Takayuki Yamada, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 19 days.

(21) Appl. No.: 17/788,365

(22) PCT Filed: Dec. 15, 2020

(86) PCT No.: PCT/JP2020/046770
§ 371 (c)(1),
(2) Date: Jun. 23, 2022

(87) PCT Pub. No.: WO2021/131907
PCT Pub. Date: Jul. 1, 2021

(65) Prior Publication Data
US 2023/0043072 A1 Feb. 9, 2023

(30) Foreign Application Priority Data
Dec. 25, 2019 (JP) ................................. 2019-234855

(51) Int. Cl.
*H01G 11/34* (2013.01)
*C01B 32/318* (2017.01)
(Continued)

(52) U.S. Cl.
CPC ........... *H01G 11/34* (2013.01); *C01B 32/318* (2017.08); *C01B 32/348* (2017.08);
(Continued)

(58) Field of Classification Search
None
See application file for complete search history.

(56) References Cited

U.S. PATENT DOCUMENTS

2006/0223701 A1 10/2006 Adrianov et al.
2009/0201630 A1 8/2009 Yoshino et al.
(Continued)

FOREIGN PATENT DOCUMENTS

CN 108439402 A 8/2018
EP 3544038 A1 * 9/2019 ............ C01B 32/30
(Continued)

OTHER PUBLICATIONS

English translation of Ido et al. WO 2012029918 (Year: 2012).*
(Continued)

*Primary Examiner* — Ronak C Patel
(74) *Attorney, Agent, or Firm* — Element IP, PLC

(57) ABSTRACT

The present invention relates to a carbonaceous material having a silicon element content of less than 200 ppm, a powder conductivity of 10.0 to 22.0 S/cm, a total amount of surface functional groups of 0.22 to 0.36 meq/g, and a pore volume of 0.10 to 0.20 $cm^3/g$ in terms of pores having a pore size of not less than 4 nm as measured by a BJH method.

11 Claims, 3 Drawing Sheets

(51) Int. Cl.
*C01B 32/348* (2017.01)
*C01B 32/378* (2017.01)

(52) U.S. Cl.
CPC ........ *C01B 32/378* (2017.08); *C01P 2006/12* (2013.01); *C01P 2006/14* (2013.01); *C01P 2006/40* (2013.01); *C01P 2006/80* (2013.01)

(56) References Cited

U.S. PATENT DOCUMENTS

| | | | | |
|---|---|---|---|---|
| 2010/0069507 | A1 | 3/2010 | Tabata et al. | |
| 2012/0177923 | A1 | 7/2012 | Kumara | |
| 2015/0030527 | A1 | 1/2015 | Gadkaree et al. | |
| 2015/0243989 | A1 * | 8/2015 | Yamada | H01M 4/587 427/113 |
| 2015/0329364 | A1 * | 11/2015 | Dong | C01B 32/348 423/460 |
| 2021/0050160 | A1 | 2/2021 | Ishida et al. | |

FOREIGN PATENT DOCUMENTS

| | | | | |
|---|---|---|---|---|
| JP | 2008021966 | A | 1/2008 | |
| JP | 2008273816 | A | 11/2008 | |
| JP | 5770550 | B2 | 8/2015 | |
| WO | WO-2008053919 | A1 | 5/2008 | |
| WO | WO-2018207769 | A1 | 11/2018 | |
| WO | WO-2019092128 | A1 * | 5/2019 | C01B 32/372 |

OTHER PUBLICATIONS

English translation of Ruan et al. (CN 110357092) (Year: 2019).*

English translation of the International Preliminary Report on Patentability and Written Opinion issued Jun. 28, 2022 in PCT/JP2020/046770.

Eva Diaz et al, "An IGC Study of the Role of Washing Procedures on the Adsorption Properties of Activated Carbons", Adsorption Science & Technology, vol. 25, No. 3/4, 2007, pp. 99-111 (plus cover pages).

International Search Report issued Feb. 22, 2021 in PCT/JP2020/046770, 3 pages.

Yeletsky, P. M. et al., "Synthesis of mesoporous carbons by leaching out natural silica templates of rice husk", Microporous and Mesoporous Materials, vol. 121, Jan. 6, 2009, pp. 34-40.

Extended European Search Report issued Jan. 24, 2024 in corresponding European Patent Application No. 20908001.9, 8 pages.

* cited by examiner

CARBONACEOUS MATERIAL, METHOD FOR PRODUCING SAME, ELECTRODE ACTIVE MATERIAL FOR ELECTRIC DOUBLE LAYER CAPACITORS, ELECTRODE FOR ELECTRIC DOUBLE LAYER CAPACITORS, AND ELECTRIC DOUBLE LAYER CAPACITOR

TECHNICAL FIELD

The present application claims the priority of Japanese Patent Application Number 2019-234855 (filing date: Dec. 25, 2019) under the Paris Convention, the entire content of which is hereby incorporated by reference.

The present invention relates to a carbonaceous material, a production method therefor, an electrode active material for an electric double-layer capacitor, an electrode for an electric double-layer capacitor, and an electric double-layer capacitor.

BACKGROUND ART

An electric double-layer capacitor, which is an electrochemical device, has better output characteristics and life characteristics than those of batteries since it utilizes a capacitance (electric double-layer capacitance) obtained by physical absorption and desorption of ions alone without accompanying chemical reaction. Because of these characteristics, a number of electric double-layer capacitors have been developed for uses in the backup of various memories, electricity generation by natural energies, and storage power sources such as UPS (Uninterruptible Power Supply). In recent years, from the viewpoint of, for example, the excellent characteristics described above and the urgent demand for measures for environmental issues, electric double-layer capacitors are attracting attention concerning their use in auxiliary power supplies and storage of regenerative energy in electric vehicles (EVs) and hybrid vehicles (HVs). Such in-vehicle electrochemical devices are required to have not only higher energy density, but also better durability under severe service conditions (for example, in a severe temperature environment) and improved capacitance, compared to those of devices for consumer uses.

In view of such demands, a variety of methods for improving the durability and the capacitance of electrochemical devices have been studied. For example, Patent Document 1 discloses a modified activated carbon wherein not only the amount of surface functional groups, but also the amount of oxygen in the skeleton are limited to enable suppression of gas generation during charge and discharge, and to enable achievement of low resistance.

Patent Document 2 discloses an activated carbon for electric double-layer capacitors, wherein an activated product of carbide is subjected to alkali washing and acid washing to reduce the silicon content to 200 to 3000 ppm, to thereby achieve high capacitance and low electric resistance.

PRIOR ART DOCUMENTS

Patent Documents

[Patent Document 1] WO 2018/207769
[Patent Document 2] JP 5770550 B

SUMMARY OF THE INVENTION

Problems to be Solved by the Invention

However, in the method described in Patent Document 1, wherein the amount of surface functional groups and the amount of oxygen in the skeleton are controlled, the gas-generation-suppressing effect was unsatisfactory. Patent Document 2 focuses on improvement of the capacitance by limiting the silicon element content in the activated carbon to within a certain range. However, although it was somewhat effective for improvement of the capacitance within such a range, the gas-generation-suppressing effect might not be necessarily satisfactory.

In view of this, an object of the present invention is to provide a carbonaceous material which is capable of suppressing gas generation during charge and discharge in an electric double-layer capacitor, and which is excellent in the moldability and the capacitance, and a production method therefor.

Means for Solving the Problems

In order to solve the above problems, the present inventors intensively studied to reach the present invention.

More specifically, the present invention encompasses the following preferred modes.

[1] A carbonaceous material having a silicon element content of less than 200 ppm, a powder conductivity of 10.0 to 22.0 S/cm, a total amount of surface functional groups of 0.22 to 0.36 meq/g, and a pore volume of 0.10 to 0.20 $cm^3/g$ in terms of pores having a pore size of not less than 4 nm as measured by a BJH method.

[2] The carbonaceous material according to [1], having a BET specific surface area of 1400 to 2200 $m^2/g$.

[3] The carbonaceous material according to [1] or [2], having an alkali metal content of less than 40 ppm.

[4] The carbonaceous material according to any one of [1] to [3], based on a plant-derived carbon precursor.

[5] The carbonaceous material according to any one of [1] to [4], wherein the plant-derived carbon precursor is coconut shell.

[6] An electrode active material for an electric double-layer capacitor, the electrode active material comprising the carbonaceous material according to any one of [1] to [5].

[7] An electrode for an electric double-layer capacitor, the electrode comprising the electrode active material for an electric double-layer capacitor according to [6].

[8] An electric double-layer capacitor comprising the electrode for an electric double-layer capacitor according to [7].

[9] A method of producing the carbonaceous material according to any one of [1] to [5], the method comprising the steps of:

carbonizing, and then activating a carbon precursor to obtain an activated carbon, followed by washing the activated carbon in an alkaline solution at not less than 65° C.; and subjecting the alkali-washed activated carbon to acid washing, and then to heat treatment at 1000 to 1300° C. under an inert gas atmosphere, followed by pulverization.

Effects of the Invention

The present invention can provide a carbonaceous material which is capable of suppressing gas generation during charge and discharge in an electric double-layer capacitor, and which is excellent in the moldability and the capacitance, and a production method therefor.

MODE FOR CARRYING OUT THE INVENTION

Figure 1:
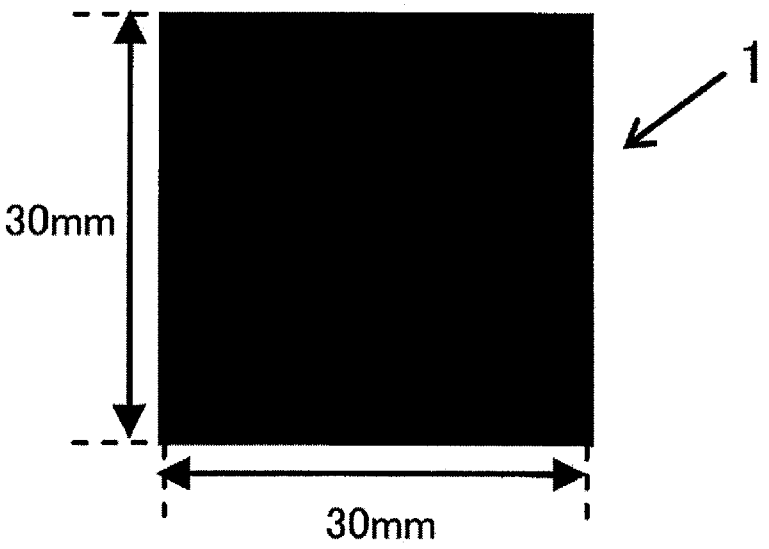
FIG. 1 is a diagram illustrating a sheet-shaped electrode composition.

Embodiments of the present invention are described below in detail. The scope of the present invention is not limited to the embodiments described below. The present invention may be modified in various ways without departing from the spirit of the present invention.

<Carbonaceous Material>

The carbonaceous material of the present invention has a silicon element content of less than 200 ppm, a powder conductivity of 10.0 to 22.0 S/cm, a total amount of surface functional groups of 0.22 to 0.36 meq/g, and a pore volume of 0.10 to 0.20 $cm^3/g$ in terms of pores having a pore size of not less than 4 nm as measured by the BJH method.

The silicon element content of the carbonaceous material of the present invention is less than 200 ppm, preferably less than 100 ppm, more preferably less than 50 ppm, still more preferably less than 20 ppm. In cases where the silicon element content is not less than 200 ppm, the amount of gas generated during charge and discharge tends to increase. The lower limit of the silicon element content of the carbonaceous material of the present invention is not limited. The silicon element content is usually not less than 1 ppm, and may be not less than 5 ppm. The silicon element content of the carbonaceous material of the present invention can be controlled based on the concentration, temperature, and the like of the washing liquid in the alkali washing step in the later-described method of producing the carbonaceous material of the present invention. The silicon element content of the carbonaceous material of the present invention can be measured by, for example, ICP (inductively coupled plasma) optical emission spectrometry as described in the Examples below.

The powder conductivity of the carbonaceous material of the present invention is not less than 10.0 S/cm, preferably not less than 13.0 S/cm, more preferably not less than 14.0 S/cm, still more preferably not less than 14.5 S/cm, especially preferably not less than 15.0 S/cm. The powder conductivity of the carbonaceous material of the present invention is not more than 22.0 S/cm, preferably not more than 21.0 S/cm, more preferably not more than 20.0 S/cm. In cases where the powder conductivity is more than 22.0 S/cm, excessive development of the carbon crystal structure of the carbonaceous material occurs to cause shrinkage of pores of the carbonaceous material, which may lead to a low initial capacitance per weight. On the other hand, in cases where the powder conductivity is less than 10.0 S/cm, the carbon crystal structure of the carbonaceous material develops only insufficiently, resulting in low crystallinity. Therefore, the electric conductivity of the carbon itself is insufficient, and the resistance during charge and discharge increases, so that the capacitance retention rate may be low. The powder conductivity of the carbonaceous material of the present invention can be controlled to within the above-described range by controlling, for example, the heat treatment temperature in the heat treatment step in the later-described method of producing the carbonaceous material of the present invention. The powder conductivity of the carbonaceous material of the present invention can be measured by the method described in the Examples below.

The total amount of surface functional groups of the carbonaceous material of the present invention is not less than 0.22 meq/g, preferably not less than 0.23 meq/g, more preferably not less than 0.24 meq/g. The total amount of surface functional groups of the carbonaceous material of the present invention is not more than 0.36 meq/g, preferably not more than 0.35 meq/g, more preferably not more than 0.34 meq/g. In cases where the total amount of surface functional groups is more than 0.36 meq/g, the active sites that react with the electrolyte in the electrode for the capacitor increase, so that the electrolyte decomposition reaction is promoted. As a result, the amount of gas generated during charge and discharge tends to increase. On the other hand, in cases where the total amount of surface functional groups is less than 0.22 meq/g, the hydrophobicity increases to change the affinities between activated carbon particles, and between activated carbon particles and other materials, which may lead to poor moldability of the carbonaceous material of the present invention, and hence to difficulty in preparation of the electrode from the carbonaceous material. The total amount of surface functional groups of the carbonaceous material of the present invention can be controlled to within the above-described range by controlling, for example, the heat treatment temperature in the heat treatment step in the later-described method of producing the carbonaceous material of the present invention. The total amount of surface functional groups of the carbonaceous material of the present invention can be measured by the method described in the Examples below.

In the carbonaceous material of the present invention, the pore volume of pores having a pore size of not less than 4 nm as measured by the BJH method is not less than 0.10 $cm^3/g$, preferably not less than 0.11 $cm^3/g$, more preferably not less than 0.13 $cm^3/g$. The pore volume of the carbonaceous material of the present invention is not more than 0.20 $cm^3/g$, preferably not more than 0.18 $cm^3/g$, more preferably not more than 0.17 $cm^3/g$. In cases where the pore volume of pores having a pore size of not less than 4 nm exceeds 0.20 $cm^3/g$, the bulk density of the electrode decreases, so that the capacitance per volume tends to decrease. On the other hand, in cases where the pore volume of pores having a pore size of not less than 4 nm is less than 0.10 $cm^3/g$, the internal resistance of the electrode tends to increase, leading to an increase in the amount of gas generated. The BJH method herein is a calculation method commonly used for the analysis of mesopores (pores having a pore diameter of 2 nm to 50 nm), similarly to the CI method and the DH method. The method was proposed by Barrett, Joyner and Halends. In the present invention, the pore volume of pores having a pore size of not less than 4 nm can be calculated by applying the BJH method to a nitrogen adsorption isotherm measured by the nitrogen adsorption method, as described in Examples. In the carbonaceous material of the present invention, the pore volume of pores having a pore size of not less than 4 nm can be controlled to within the above-described range by appropriately selecting the type of the carbon precursor used, or by appropriately controlling, for example, the temperature and/or treatment time in the activation step in the later-described method of producing the carbonaceous material of the present invention.

In the carbonaceous material of the present invention, the pore volume of micropores (pores having a pore diameter of less than 2 nm) as measured by the MP method is preferably not less than 0.60 $cm^3/g$, more preferably not less than 0.63 $cm^3/g$, still more preferably not less than 0.66 $cm^3/g$. The pore volume of micropores is preferably not more than 1.20 $cm^3/g$, more preferably not more than 1.10 $cm^3/g$, still more preferably not more than 1.00 $cm^3/g$. In cases where the pore volume of micropores is within the above-described range, the resistance that is thought to be due to diffusion resistance of nonaqueous electrolyte ions in the pores tends to decrease, and the bulk density of the electrode tends to increase, so that the capacitance per unit area tends to be high. The MP method herein is a calculation method commonly used in the micropore analysis similarly to the HK method and the SF method. In the present invention, the pore volume of micropores can be calculated by applying the MP method to a nitrogen adsorption isotherm measured by the nitrogen adsorption method, as described in Examples. In the carbonaceous material of the present invention, the pore volume of micropores can be controlled to within the above-described range by appropriately selecting the type of the carbon precursor used, or by appropriately controlling, for example, the temperature and/or treatment time in the activation step in the later-described method of producing the carbonaceous material of the present invention.

The BET specific surface area of the carbonaceous material of the present invention is preferably not less than 1400 $m^2/g$, more preferably not less than 1430 $m^2/g$, still more preferably not less than 1450 $m^2/g$, still more preferably not less than 1500 $m^2/g$. The BET specific surface area of the carbonaceous material of the present invention is preferably not more than 2200 $m^2/g$, more preferably not more than 2150 $m^2/g$, still more preferably not more than 2100 $m^2/g$, especially preferably less than 2000 $m^2/g$. In cases where the BET specific surface area is within the above-described range, the resistance that is thought to be due to diffusion resistance of nonaqueous electrolyte ions in the pores tends to decrease, and the bulk density of the electrode tends to increase, so that the capacitance per unit area tends to be high. The BET specific surface area of the carbonaceous material of the present invention can be controlled to within the above-described range by controlling, for example, the temperature and/or treatment time in the activation step in the later-described method of producing the carbonaceous material of the present invention. The BET specific surface area of the carbonaceous material of the present invention can be measured by, for example, the method described in the Examples below in which a nitrogen adsorption isotherm is measured.

The alkali metal content of the carbonaceous material of the present invention is preferably less than 40 ppm, more preferably less than 20 ppm, still more preferably less than 10 ppm. The lower limit of the alkali metal content of the carbonaceous material of the present invention is not limited. The alkali metal content may be 0 ppm. It is usually not less than 1 ppm, and may be not less than 3 ppm. Examples of the alkali metal species that may be contained in the carbonaceous material include lithium, sodium, potassium, cesium, and the like. Since sodium and/or potassium is/are usually contained in a large amount, control of their content is important. In cases where the alkali metal content is within the above-described range, elution of alkali metal elements into the electrolyte is less likely to occur, so that a short circuit due to reprecipitation is less likely to occur. Further, since clogging of pores of the carbonaceous material by the alkali metals is less likely to occur, the charge-discharge capacity tends to be high. The alkali metal content of the carbonaceous material of the present invention can be controlled by the alkali washing and/or acid washing in the later-described method of producing the carbonaceous material of the present invention. The alkali metal content of the carbonaceous material of the present invention can be measured by, for example, ICP optical emission spectrometry as described in the Examples below.

<Method of Producing Carbonaceous Material>

The carbonaceous material of the present invention can be produced by, for example, a method comprising the steps of:

- carbonizing, and then activating a carbon precursor to obtain an activated carbon, followed by washing the activated carbon in an alkaline solution at not less than 65° C.; and
- subjecting the alkali-washed activated carbon to acid washing, and then to heat treatment at 1000 to 1300° C. under an inert gas atmosphere, followed by pulverization.

In the present invention, the carbon precursor as the raw material of the carbonaceous material is not limited as long as the carbonaceous material can be formed by the activation of the carbon precursor, and the carbon precursor may be selected from a wide range of carbon precursors such as carbon precursors derived from plants, carbon precursors derived from minerals, carbon precursors derived from natural materials, and carbon precursors derived from synthetic materials. From the viewpoint of reducing harmful impurities, from the viewpoint of environmental protection, and from a commercial point of view, the carbonaceous material of the present invention is preferably based on a carbon precursor derived from a plant. In other words, the carbon precursor for providing the carbonaceous material of the present invention is preferably derived from a plant.

The carbon precursors derived from minerals include petroleum-based and coal-based pitch and coke. Examples of the carbon precursors derived from natural materials include natural fibers such as cotton and hemp; regenerated fibers such as rayon and viscous rayon; and semisynthetic fibers such as acetate or triacetate fibers. Examples of the carbon precursors derived from synthetic materials include polyamide-based materials such as nylon; polyvinyl alcohol-based materials such as vinylon; polyacrylonitrile-based materials such as acryl; polyolefin-based materials such as polyethylene and polypropylene; polyurethane; phenol-based resins; and vinyl chloride-based resins.

In the present invention, the carbon precursor derived from a plant is not limited. Examples of such a carbon precursor include, but are not limited to, wood; charcoal; rice husk; fruit shells such as coconut shell and palm shell; coffee beans; tea leaves; sugar cane; fruits (such as mandarin oranges and bananas); straw; rice husk; hardwoods; conifers; and bamboos. These examples include wastes obtained after subjecting the materials to their original uses (such as used tea leaves), and parts of the plant raw materials (such as banana or mandarin orange peels). These plant raw materials may be used either individually or as a combination of two or more thereof. Among these plant raw materials, coconut shell is preferred since it is easily available, and since carbonaceous materials having a variety of characteristics can be produced therefrom.

Examples of the coconut shell include, but are not limited to, palm shells of palm (oil palm), coconut palm, salak, and double coconut. These coconut shells may be used either individually or as a combination of two or more thereof. From the viewpoint of availability, the coconut shell of coconut or palm is especially preferably, which is a biomass waste generated in a large amount after using as a food, detergent raw material, biodiesel oil raw material, or the like.

Coconut shell can be obtained in the form of char (coconut shell char) by preliminary calcination. This is preferably used as the raw material. The char generally means a solid in the form of a carbon-rich powder produced by heating coal without allowing its melting/softening. The char herein also means a solid in the form of a carbon-rich, powder produced by heating an organic matter without allowing its melting/softening. The method of producing the char from the coconut shell is not limited. The char can be produced by using a method known in the art. For example, the char can be produced by subjecting the raw material coconut shell to calcination (carbonizing treatment) at a temperature of about 400 to 800° C. under an atmosphere of an inert gas such as nitrogen, carbon dioxide, helium, argon, carbon monoxide, or fuel exhaust gas; a mixed gas of these inert gases; or a mixed gas containing these inert gases as a major component and other gases.

<Activation Treatment>

The activated carbon derived from coconut shell used in the method of producing the carbonaceous material of the present invention can be obtained by, for example, subjecting the carbon precursor (coconut shell char) to activation treatment. The activation treatment is a treatment for forming pores on the surface of the carbon precursor to change the carbon precursor into a porous carbonaceous substance. By this, an activated carbon having a large specific surface area and pore volume can be obtained. In cases where the carbon precursor is used as it is without carrying out the activation treatment, the specific surface area and the pore volume of the resulting carbonaceous substance are insufficient. Therefore, in cases of use as an electrode material, it is difficult to secure a sufficiently high initial capacitance, so that the carbonaceous material of the present invention cannot be obtained. The activation treatment can be carried out by a common method in the art. Examples of the treatment method mainly include two kinds of methods: gas activation treatment and chemical activation treatment.

Known examples of the gas activation treatment include a method in which a carbon precursor is heated in the presence of steam, carbon dioxide, air, oxygen, combustion gas, or a mixed gas thereof. Known examples of the chemical activation treatment include a method in which an activator such as zinc chloride, calcium chloride, phosphoric acid, sulfuric acid, sodium hydroxide, potassium hydroxide, magnesium hydroxide, or calcium hydroxide is mixed with a carbon precursor, followed by heating the resulting mixture under an inert gas atmosphere. In the present invention, the gas activation treatment is preferably employed since the chemical activation requires a step of removing the residual agent, which requirement makes the production method laborious.

In cases where steam activation is employed as the gas activation treatment, from the viewpoint of efficiently allowing the activation to proceed, it is preferred to use a mixture of steam and an inert gas selected as in the carbonization treatment. The steam partial pressure in this case is preferably within the range of 10 to 60%. In cases where the steam partial pressure is not less than 10%, the activation can be easily and sufficiently allowed to proceed. In cases where the steam partial pressure is not more than 60%, rapid activation reaction can be suppressed, so that the reaction can be easily controlled.

The total amount of the activation gas supplied in the steam activation is preferably 50 to 10,000 parts by mass, more preferably 100 to 5000 parts by mass, still more preferably 200 to 3000 parts by mass with respect to 100 parts by mass of the carbon precursor. In cases where the total amount of the activation gas supplied is within the range described above, the activation reaction can be allowed to proceed more efficiently.

The specific surface area and the pore volume of the activated carbon derived from the raw-material coconut shell can be controlled by changing the method of activation treatment of the carbon precursor, conditions of the method, and/or the like. For example, in cases where an activation-treated activated carbon is obtained by steam activation treatment, the specific surface area and the pore volume can be controlled based on the gas used, the heating temperature and time, and/or the like. In the steam activation treatment, the specific surface area and the pore size of the activation-treated activated carbon obtained tend to be smaller as the heating temperature decreases, while they tend to be larger as the heating temperature increases. In the present invention, in cases where an activation-treated activated carbon is obtained by steam activation treatment, the heating temperature (activation temperature) is usually 700 to 1100° C., preferably 800 to 1000° C. although the heating temperature depends on the type of the gas. The heating time and the heating rate are not limited, and may be appropriately decided based on the heating temperature, the specific surface area of the desired activation-treated activated carbon, and/or the like.

When necessary, the activation treatment may be carried out once, or two or more times. In cases where the activation treatment is carried out two or more times, for example, a step of washing the activated carbon after the first activation (the activation is hereinafter also referred to as primary activation, and the activated carbon is hereinafter also referred to as primary activation-treated activated carbon) using an acid may be included for the purpose of removing impurities such as alkali metals. The acid washing step can be carried out by immersing the activated carbon after the activation, in a washing liquid containing the acid. After the acid washing, the activated carbon is sufficiently washed with water, preferably ion-exchanged water, to remove the residual acid. The activated carbon is then dried to obtain a primary washed activated carbon. By subjecting the primary washed activated carbon to the activation treatment again, a secondary activation-treated activated carbon is obtained. The activated carbons after the first, second, or later activation treatment are hereinafter collectively referred to as activation-treated activated carbon.

The conditions of the acid washing after the activation are not limited. The type and the concentration of the acid used, the washing temperature, the washing time, and the like may be appropriately controlled. In a preferred embodiment of the acid washing, for example, the type of the acid may be hydrochloric acid, nitric acid, sulfuric acid, or a mixture thereof, preferably hydrochloric acid; the concentration may be 0.01 to 5 N, preferably 0.1 to 2 N; the washing temperature may be 40 to 120° C., preferably 60 to 100° C.; and the washing time may be 5 minutes to 6 hours, preferably 10 minutes to 3 hours.

The conditions of the second and later activations are also not limited. Similarly to the primary activation, the heating temperature, the heating time, and the like may be appropriately determined based on, for example, the specific surface area of the desired activation-treated activated carbon.

<Alkali Washing Step>

The method of producing the carbonaceous material of the present invention comprises a step of subjecting the activation-treated activated carbon after the activation to washing with an alkaline solution at not less than 65° C. The alkali washing step is a step of washing the activation-treated activated carbon with an alkaline washing liquid at not less than 65° C. to remove the silicon element contained in the activation-treated activated carbon. The alkali washing step can be carried out by, for example, subjecting the activation-treated activated carbon obtained after the activation to immersion in a washing liquid at not less than 65° C. Examples of the washing liquid include an aqueous solution of sodium hydroxide, potassium hydroxide, and lithium hydroxide. From the viewpoint of availability, the washing liquid is preferably an aqueous solution of sodium hydroxide.

The liquid temperature during the alkali washing is not less than 65° C., preferably not less than 70° C., more preferably not less than 80° C. Regarding the upper limit of the liquid temperature, the liquid temperature is preferably not more than 110° C., more preferably not more than 105° C., especially preferably not more than 100° C. In cases where the liquid temperature is within the range described above, the silicon element concentration in the activation-treated activated carbon can be sufficiently reduced, and the step can be safely carried out, which is preferred.

The alkali concentration in the washing liquid is not limited. The concentration may be appropriately adjusted based on the type of the washing liquid used. The alkali concentration of the washing liquid is preferably not less than 0.01 N, more preferably not less than 0.03 N. Regarding the upper limit of the alkali concentration, the alkali concentration is preferably not more than 10 N, more preferably not more than 5 N. In cases where the alkali concentration is too low, the number of times of washing needs to be increased for the removal of the silicon element, while in cases where the alkali concentration is too high, the amount of the residual alkali component increases. Thus, within the concentration range described above, the alkali washing step can be efficiently carried out, which is preferred from the viewpoint of the productivity.

The pH of the washing liquid for the alkali washing is not limited, and may be appropriately adjusted based on, for example, the type of the washing liquid used. The pH is preferably not less than 12 from the viewpoint of reducing the washing time or the number of times of washing.

The mass ratio between the washing liquid and the activation-treated activated carbon during the immersion of the activation-treated activated carbon in the washing liquid may be appropriately adjusted based on, for example, the type, concentration, temperature, and/or the like of the washing liquid used. The mass of the activation-treated activated carbon to be immersed with respect to the mass of the washing liquid is preferably not less than 2% by mass, more preferably not less than 5% by mass. Regarding the upper limit of the mass ratio, the mass ratio is preferably not more than 50% by mass, more preferably not more than 30% by mass. In cases where the mass ratio is within the range described above, excessive energy is unnecessary for the heating of the washing liquid, and a sufficient washing effect can be obtained, which is preferred.

The atmosphere for carrying out the alkali washing is not limited, and may be appropriately selected based on the method used for the washing. In the present invention, the washing is usually carried out under air atmosphere.

The method of alkali washing of the activation-treated activated carbon is not limited as long as the activation-treated activated carbon can be immersed in the washing liquid. The method may be either a method in which the immersion is carried out by continuously adding the washing liquid while retaining the washing liquid for a certain period and removing the washing liquid, or a method in which the activation-treated activated carbon is immersed in the washing liquid, retained for a certain period, and then removed, followed by newly adding the washing liquid to repeat the immersion–liquid removal. The method may be either a method in which the whole washing liquid is replaced, or a method in which part of the washing liquid is replaced. The washing liquid may be stirred during the immersion.

The length of time of the immersion of the activation-treated activated carbon in the washing liquid may be appropriately controlled based on the washing liquid used, the treatment temperature, and/or the like. For sufficient reduction of the silicon in the activation-treated activated carbon, the length of time is preferably not less than 5 minutes. From the viewpoint of the productivity, the length of time is preferably not more than 50 minutes, more preferably not more than 40 minutes, still more preferably not more than 35 minutes, still more preferably not more than 30 minutes.

After the alkali washing of the activation-treated activated carbon, the activation-treated activated carbon may be washed with water for the removal of the residual washing liquid.

<Acid Washing Step>

The method of producing the carbonaceous material of the present invention comprises a step of subjecting the activation-treated activated carbon after the alkali washing to washing with an acidic solution. The acid washing step after the alkali washing is a step of subjecting the activation-treated activated carbon after the alkali washing to washing with an acidic washing liquid, to remove impurities such as metals. The acid washing step after the alkali washing can be carried out by, for example, subjecting the activation-treated activated carbon obtained after the alkali washing to immersion in an acidic washing liquid. Examples of the washing liquid include hydrochloric acid, nitric acid, and sulfuric acid. The washing liquid is preferably hydrochloric acid since it does not oxidize charcoal.

The acid concentration in the acid washing liquid after the alkali washing is not limited. The concentration may be appropriately adjusted based on the type of the washing liquid used. The acid concentration in the washing liquid is preferably not less than 0.01 N, more preferably not less than 0.1 N. Regarding the upper limit of the acid concentration, the acid concentration is preferably not more than 5 N, more preferably not more than 2 N. In cases where the acid concentration is too low, the number of times of washing needs to be increased, while in cases where the acid concentration is too high, the amount of the residual acid component increases. Thus, within the concentration range described above, the acid washing step can be efficiently carried out, which is preferred from the viewpoint of the productivity.

The pH of the acid washing liquid after the alkali washing is not limited, and may be appropriately adjusted based on, for example, the type of the washing liquid used. The pH is preferably not more than 2 from the viewpoint of reducing the number of times of washing.

The liquid temperature of the acid washing liquid after the alkali washing is not limited, and may be appropriately adjusted based on, for example, the type of the washing liquid used. The liquid temperature is preferably 40° C. to 100° C. from the viewpoint of the metal-removing capacity.

The mass ratio between the washing liquid and the activation-treated activated carbon during the immersion of the activation-treated activated carbon in the acid washing liquid may be appropriately adjusted based on, for example, the type, concentration, temperature, and/or the like of the washing liquid used. The mass of the activation-treated activated carbon to be immersed with, respect to the mass of the washing liquid is preferably not less than 2% by mass, more preferably not less than 5% by mass. Regarding the upper limit of the mass ratio, the mass ratio is preferably not more than 50% by mass, more preferably not more than 30% by mass. In cases where the mass ratio is not more than the lower limit, a large amount of energy may be required for heating the washing liquid, while in cases where the mass ratio is not less than the upper limit, a sufficient washing effect can be hardly obtained.

The atmosphere for carrying out the acid washing after the alkali washing is not limited, and may be appropriately selected based on the method used for the washing. In the present invention, the washing is usually carried out under air atmosphere.

The method of washing the activation-treated activated carbon is not limited as long as the activation-treated activated carbon can be immersed in the washing liquid. The method may be either a method in which the immersion is carried out by continuously adding the washing liquid while retaining the washing liquid for a certain period and removing the washing liquid, or a method in which the activation-treated activated carbon is immersed in the washing liquid, retained for a certain period, and then removed, followed by newly adding the washing liquid to repeat the immersion–liquid removal. The method may be either a method in which the whole washing liquid is replaced, or a method in which part of the washing liquid is replaced. The length of time of the immersion of the activation-treated activated carbon in the washing liquid may be appropriately controlled based on the washing liquid used, the treatment temperature, and/or the like. For sufficient removal of metals, the length of time is preferably not less than 5 minutes, more preferably not less than 10 minutes.

After the acid washing, the activation-treated activated carbon may be washed with water. The method of producing the carbonaceous material of the present invention may comprise a deacidification step for removal of the acid derived from the residual acid washing liquid in the activation-treated activated carbon. In the present invention, the deacidification step means a step of removing the residual acid in the activation-treated activated carbon after the acid washing. The step is preferably carried out by a method in which the activation-treated activated carbon is heated for a short time under an oxidative gas atmosphere.

Examples of the oxidative gas include oxygen, steam, carbon dioxide gas, and combustion gases obtained by burning kerosene or propane. These gases may be used either individually or as a mixed gas prepared by mixing two or more thereof.

The heating time and temperature under the oxidative gas atmosphere are not limited. For avoiding a significant change in the pore structure prepared, the treatment is preferably carried out at 500° C. to 1000° C. for 5 minutes to 60 minutes.

<Heat Treatment Step>

The method of producing the carbonaceous material of the present invention comprises a heat treatment step. By subjecting the activated carbon after the alkali washing step and the acid washing step (hereinafter referred to as alkali- and acid-washed activated carbon) to the heat treatment, the carbon structure can be developed to achieve a conductivity within a desired range. In some cases, this step results in a decrease in amount of surface functional groups to an amount outside a desired range. However, by carrying out the later-described pulverization step after the heat treatment step, the amount of surface functional groups can be adjusted to within the desired range. Regarding the lower limit of the heat treatment temperature, the heat treatment temperature is preferably not less than 1000° C., more preferably not less than 1100° C., still more preferably more than 1100° C., still more preferably not less than 1150° C. Regarding the upper limit of the heat treatment temperature, the heat treatment temperature is preferably not more than 1300° C., more preferably not more than 1250° C. In cases where the heat treatment temperature is too low, the development of the carbon structure is insufficient, so that the conductivity hardly reaches a desired value. In cases where the heat treatment temperature is too high, pore shrinkage occurs, leading to difficulty in securing a sufficiently high initial capacitance when used for an electrochemical device. The heat treatment time after reaching the desired temperature is preferably 10 minutes to 120 minutes from the viewpoint of allowing sufficient development of the carbon structure and avoiding excessive pore shrinkage. The heating rate is preferably 2° C./minute to 20° C./minute from the viewpoint of saving the time of the heat treatment step and suppressing deterioration of the facility.

Preferably, the heat treatment is carried out under inert-gas conditions, or under an atmosphere of the gas generated from the activated carbon while oxygen or air is blocked. Examples of the inert gas used for the heat treatment include nitrogen gas, argon gas, and helium gas. These gases may be used either individually or as a mixed gas prepared by mixing two or more thereof.

Examples of furnaces that may be used for the heat treatment include various forms of furnaces such as rotary kilns, fluidized bed furnaces, fixed bed furnaces, moving layer furnaces, and moving bed furnaces. Either a continuous furnace, for which the feeding of the raw material and the removal of the product are continuously carried out, or a batch furnace, for which these are carried out intermittently, may be applied. The heating means is not limited as long as the means allows heating to a predetermined temperature. Examples of applicable means include electric heating, gas combustion heating, high-frequency induction heating, and energization heating. These heating means may be used either individually or in combination.

<Pulverization Step>

The method of producing the carbonaceous material of the present invention comprises a pulverization step after the heat treatment step. The pulverization step is a step for controlling the shape and the particle size of the finally obtained carbonaceous material to a desired shape and a desired particle size. Since the amount of surface functional groups can be controlled to within an appropriate range by the pulverization step, moldability of the carbonaceous material can be improved. The particle size of the carbonaceous material of the present invention is not limited. In cases where the carbonaceous material is used for an electric double-layer capacitor, the carbonaceous material is preferably pulverized to an average particle size of preferably 1 to 15 μm, more preferably 2 to 10 μm.

The pulverizer used for the pulverization is not limited. Examples of the pulverizer include known pulverizers such as cone crushers, double-roll crushers, disk crushers, rotary crushers, ball mills, centrifugal rolling mills, ring rolling mills, centrifugal ball mills, and jet mills, which may be used either individually or in combination.

<Classifying Step>

In the present invention, the method of producing the carbonaceous material may comprise a classifying step. For example, by removing particles having a particle size that is extremely smaller or larger compared to a desired particle size, carbonaceous material particles having a narrow particle size distribution range can be obtained. By this, the electrode can be composed with a smaller amount of binder. Examples of the method of the classification include, but are not limited to, classification using a sieve, wet classification, and dry classification. Examples of wet classifiers include classifiers utilizing the principle of gravitational classification, inertial classification, hydraulic classification, centrifugal classification, or the like. Examples of dry classifiers include classifiers utilizing the principle of sedimentary classification, mechanical classification, centrifugal classification, or the like. From an economic point of view, a dry classifier is preferably used.

The pulverization and the classification may be carried out using a single apparatus. For example, the pulverization and the classification may be carried out using a jet mill having a dry classification function. Further, an apparatus in which a pulverizer and a classifier are independently provided may be used. In this case, the pulverization and the classification may be carried out either continuously or discontinuously.

The carbonaceous material of the present invention can be preferably used as an electrode active material for an electric double-layer capacitor. By the use of the carbonaceous material of the present invention, the electric double-layer capacitor can have an excellent capacitance while the amount of gas generated during charge and discharge can be reduced. Thus, one embodiment of the present invention can provide

- an electrode active material for an electric double-layer capacitor, the electrode active material comprising the carbonaceous material of the present invention,
- an electrode for an electric double-layer capacitor, the electrode comprising the active material, and
- an electric double-layer capacitor comprising the electrode.

The electrode active material for the electric double-layer capacitor of the present invention can be produced by using the carbonaceous material of the present invention. The production may include common conventional production steps for electrode materials in the art, such as a step of kneading the raw-material carbonaceous material of the present invention with a component such as a conductivity-imparting agent, binder, or solvent, and a step of applying and drying the kneaded product. The electrode for the electric double-layer capacitor can be produced using the electrode active material. The production process for the electrode may include, for example, a step of adding a solvent to the raw-material electrode active material to prepare a paste, a step of applying the paste to a current collector such as an aluminum foil and then removing the solvent by drying, and a step of placing the paste in a mold and carrying out press molding.

Examples of conductivity-imparting agents that may be used for this electrode include acetylene black and Ketjen black. Examples of binders that may be used include fluorine-based macromolecular compounds such as polytetrafluoroethylene and polyvinylidene difluoride; carboxymethylcellulose; styrene-butadiene rubbers; petroleum pitch; and phenol resins. Examples of solvents that may be used include water; alcohols such as methanol and ethanol; saturated hydrocarbons such as hexane and heptane; aromatic hydrocarbons such as toluene, xylene, and mesitylene; ketones such as acetone and ethyl methyl ketone; esters such as methyl acetate and ethyl acetate; amides such as N,N-dimethylformamide and N,N-diethylformamide; and cyclic amides such as N-methylpyrrolidone and N-ethylpyrrolidone.

The electric double-layer capacitor of the present invention is characterized in that it comprises the electrode. In general, an electric double-layer capacitor comprises electrodes, an electrolyte, and a separator as major components, and has a structure in which the separator is placed between a pair of electrodes. Examples of the electrolyte include electrolytes in which an amidine salt is dissolved in an organic solvent such as propylene carbonate, ethylene carbonate, or methyl ethyl carbonate; electrolytes in which a quaternary ammonium salt of perchloric acid is dissolved; electrolytes in which the tetrafluoroborate salt or hexafluorophosphate salt of a quaternary ammonium or an alkali metal such as lithium is dissolved; and electrolytes in which a quaternary phosphonium salt is dissolved. Examples of the separator include non-woven fabrics, clothes, and macroporous films comprising, as a major component, cellulose, glass fibers, or a polyolefin such as polyethylene or polypropylene. The electric double-layer capacitor can be produced by placing these major components by a common conventional method in the art.

The carbonaceous material of the present invention has excellent moldability. In addition, an electric double-layer capacitor comprising an electrode produced from the carbonaceous material effectively suppresses gas generation during charge and discharge, and has an excellent capacitance.

EXAMPLES

The present invention is described below concretely by way of Examples. However, these do not limit the scope of the present invention.

The physical property values in the Examples were measured according to the methods described below.

<Contents of Silicon Element, Sodium Element, and Potassium Element>

The contents of silicon element, sodium element, and potassium element were measured by the following method. First, calibration curves for the contents of silicon element, sodium element, and potassium element were prepared using standard solutions with known concentrations. Subsequently, a pulverized measurement sample was dried at 115° C. for 3 hours, and 0.1 g of the dried sample was placed in a decomposition vessel. After adding 10 ml of nitric acid thereto, the resulting mixture was mixed, and then the sample was dissolved using a microwave sample pretreatment apparatus ("MARS6", manufactured by CEM). The resulting solution was taken out, and then its volume was adjusted to 25 ml to prepare a measurement solution, followed by performing analysis using an ICP optical emission spectrometer ("ICPE-9820", manufactured by Shimadzu Corporation). From the values obtained and the calibration curves prepared in advance, each concentration was determined, and then the content of each element was calculated according to the following equation.

$$\text{Element content (ppm)} = \frac{\{\text{Element concentration according to } ICP \text{ optical emission spectrometry (ppm)} \times 25 \times 1000\}}{\{\text{Sample weight (g)} \times 1000\}}$$

<Powder Conductivity>

The conductivity of the carbonaceous material was measured using a powder resistivity measurement unit "MCP-PD51" manufactured by Mitsubishi Chemical Analytech Co., Ltd. The amount of the sample used in the measurement of the conductivity corresponded to an amount in which the thickness of the activated carbon pellet becomes 3.5 to 4.5 mm by application of a load of 12 kN. The conductivity of the activated carbon pellet was measured in the state where a load of 12 kN was applied.

<Amount of Surface Functional Groups>

The amount of surface functional groups was measured by the hydrochloric acid titration method, which is known from H. P. Boehm, Advan. Catal., 1966, 16, 179 and the like. More specifically, sodium ethoxide manufactured by Kojundo Chemical Lab. Co., Ltd. was used to prepare 0.1 N ethanol solution as the measurement solution. To 25 ml of this measurement solution, 0.5 g of a carbonaceous material was added as a sample, and the resulting mixture was stirred at 25° C. for 24 hours. Thereafter, centrifugation was carried out to separate the measurement solution from the carbonaceous material, and 10 ml of the measurement solution was collected. The collected measurement solution was subjected to neutralization titration to a titration end point of pH 4.0 with 0.1N hydrochloric acid using "888 Titrando", manufactured by Metrohm AG (Switzerland), to determine the sample titer. In addition, a blank test was carried out with a solution containing no sample to determine the blank test titer, and the amount of surface functional groups was calculated according to the following equation.

$$\text{Amount of surface functional groups}(meq/g)=\{\text{blank test titer}(mL)-\text{sample titer}(mL)\}\times 0.1\times f(\text{hydrochloric acid factor})/\text{weight of carbonaceous material used}(g)\times 25(mL)/10(mL)$$

<Nitrogen Adsorption Isotherm>

Using BELSORP-mini, manufactured by MicrotracBEL Corp., a carbonaceous material sample was heated at 300° C. for 3 hours under nitrogen gas flow (nitrogen flow rate: 50 mL/minute), and then the nitrogen adsorption isotherm of the carbonaceous material at 77 K was measured.

<Volume of 4-nm or Larger Pores>

For the nitrogen adsorption isotherm obtained, the pore volume of pores having a pore size of not less than 4 nm as calculated using the BJH method within the range of relative pressure P/Po of not more than 0.99 was determined. In the analysis by the BJH method, the standard t curve "NGCB-BEL.t" provided by MicrotracBEL Corp. was used.

<Pore Volume of Micropores>

For the nitrogen adsorption isotherm obtained, the pore volume of micropores was determined using the MP method. In the analysis by the MP method, the standard t curve "NGCB-BEL.t" provided by MicrotracBEL Corp. was used.

<BET Specific Surface Area>

From the nitrogen adsorption isotherm obtained, analysis by the multipoint method was carried out by the BET method, and the specific surface area was calculated from the straight line within the range of relative pressure P/Po of 0.01 to 0.1 in the obtained curve.

<Particle Size Distribution>

The particle size of the carbonaceous material was measured by the laser diffraction measurement method. More specifically, the carbonaceous material to be subjected to the measurement was placed in ion-exchanged water together with a surfactant, and ultrasonic vibration was applied thereto using BRANSONIC M2800-J, manufactured by EMERSON, to prepare a homogeneous dispersion, followed by performing the measurement by the transmission method using Microtrac MT3200, manufactured by MicrotracBEL Corp. The concentration of the carbonaceous material in the homogeneous dispersion was adjusted such that the concentration was within the measurable concentration range displayed by the apparatus. As the surfactant used for the purpose of allowing the homogeneous dispersion, "Polyoxyethylene (10) octylphenylether (Triton X-100)", manufactured by Fujifilm Wako Pure Chemical Corporation was used. The surfactant was added in an appropriate amount in which the homogeneous dispersion was possible, and in which air bubbles and the like that affect the measurement were not generated. The analysis conditions were as follows.

(Analysis Conditions)

Number of times of measurement: 1
Measurement time: 30 seconds
Distribution display: volume
Particle size division: standard
Calculation mode: MT3000
Solvent name: WATER
Upper measurement limit: 1408 μm; lower measurement limit: 0.243 μm
Residual ratio: 0.00
Passing ratio: 0.00
Residual ratio setting: invalid
Particle transparency: transparent
Particle refractive index: 1.81
Particle shape: nonspherical
Solvent refractive index: 1.333
DV value: 0.0150 to 0.0500
Transmittance (TR): 0.750 to 0.920
Flow rate: 50%

In the following Examples, the average particle size of the carbonaceous material represents the value of the particle size at the volume ratio of 50% in the volume cumulative particle size distribution displayed.

Example 1

Char prepared using, as a raw material, coconut shell produced in the Philippines (specific surface area: 370 $m^2$/g) was subjected to primary activation using propane combustion gas+steam (steam partial pressure: 25%) at 850° C., to obtain a primary activation-treated activated carbon having a specific surface area of 1185 $m^2$/g. Thereafter, the activated carbon was washed with hydrochloric acid (concentration: 0.5 N, diluent: ion-exchanged water) at a temperature of 85° C. for 30 minutes. Subsequently, in order to remove the residual acid, the activated carbon was sufficiently washed with ion-exchanged water, and dried, to obtain a primary washed activated carbon having a potassium element content of 150 ppm. The primary washed activated carbon was subjected to secondary activation using propane combustion gas (steam partial pressure: 15%) at 950° C., to obtain a secondary activation-treated activated carbon having a specific surface area of 1670 $m^2/g$. The resulting secondary activation-treated activated carbon was subjected to alkali washing using an aqueous solution of sodium hydroxide (concentration: 1 N, diluent: ion-exchanged water) at 100° C. for 30 minutes. Subsequently, in order to remove the residual base, the activated carbon was sufficiently washed with ion-exchanged water. The activated carbon was then subjected to acid washing using hydrochloric acid (concentration: 1 N, diluent: ion-exchanged water) at a temperature of 100° C. for 30 minutes. Subsequently, the activated carbon was sufficiently washed with ion-exchanged water, and dried, followed by carrying out heat treatment under a flow of nitrogen+steam (steam partial pressure: 3%) at 700° C. for 60 minutes to remove the residual acid, to thereby obtain an alkali- and acid-washed activated carbon. The resulting alkali- and acid-washed activated carbon was heated from room temperature to 1000° C. under nitrogen gas flow (heating rate: from room temperature to 600° C.; 10° C./minute, from 600 to 900° C.; 5° C./minute, from 900° C. to 1000° C.; 2.5° C./minute), and subjected to heat treatment at 1000° C. for 60 minutes, followed by cooling the activated carbon to room temperature and then pulverizing the activated carbon to an average particle size of 6 μm, to obtain a carbonaceous material for a capacitor electrode. The treatment conditions, and the physical properties of the obtained carbonaceous material were as shown in Table 1.

Example 2

An alkali- and acid-washed activated carbon obtained in the same manner as in Example 1 was heated from room temperature to 1100° C. under nitrogen gas flow (heating rate: from room temperature to 600° C.; 10° C./minute, from 600 to 900° C.; 5° C./minute, from 900° C. to 1100° C.; 2.5° C./minute), and subjected to heat treatment at 1100° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 3

An alkali- and acid-washed activated carbon obtained in the same manner as in Example 1 was heated from room temperature to 1200° C. under nitrogen gas flow (heating rate: from room temperature to 600° C.; 10° C./minute, from 600 to 900° C.; 5° C./minute, from 900° C. to 1100° C.; 2.5° C./minute, from 1100 to 1200° C.; 2° C./minute), and subjected to heat treatment at 1200° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 4

An alkali- and acid-washed activated carbon obtained in the same manner as in Example 1 was heated from room temperature to 1300° C. under nitrogen gas flow (heating rate: from room temperature to 600° C.; 10° C./minute, from 600 to 900° C.; 5° C./minute, from 900° C. to 1100° C.; 2.5° C./minute, from 1100 to 1300° C.; 2° C./minute), and subjected to heat treatment at 1300° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 5

A secondary activation-treated activated carbon obtained in the same manner as in Example 1 was subjected to the same operation as in Example 1 except that the concentration of the aqueous solution of sodium hydroxide was 0.05 N, to obtain an alkali- and acid-washed activated carbon. The resulting alkali- and acid-washed activated carbon was heated from room temperature to 1100° C. under nitrogen gas flow (heating rate: from room temperature to 600° C.; 10° C./minute, from 600 to 900° C.; 5° C./minute, from 900° C. to 1100° C.; 2.5° C./minute), and subjected to heat treatment at 1100° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 6

A secondary activation-treated activated carbon obtained in the same manner as in Example 1 was subjected to the same operation as in Example 1 except that the length of time for the washing with the aqueous solution of sodium hydroxide was 10 minutes, to obtain an alkali- and acid-washed activated carbon. The resulting alkali- and acid-washed activated carbon was heated from room temperature to 1100° C. under nitrogen gas flow (heating rate: from room temperature to 600° C.; 10° C./minute, from 600 to 900° C.; 5° C./minute, from 900° C. to 1100° C.; 2.5° C./minute), and subjected to heat treatment at 1100° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 7

A secondary activation-treated activated carbon obtained in the same manner as in Example 1 was subjected to the same operation as in Example 1 except that the temperature for the washing with the aqueous solution of sodium hydroxide was 70° C., to obtain an alkali- and acid-washed activated carbon. The resulting alkali- and acid-washed activated carbon was heated from room temperature to 1100° C. under nitrogen gas flow (heating rate: from room temperature to 600° C.; 10° C./minute, from 600 to 900° C.; 5° C./minute, from 900° C. to 1100° C.; 2.5° C./minute), and subjected to heat treatment at 1100° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 8

The same char as in Example 1 was subjected to primary activation using propane combustion gas+steam (steam partial pressure: 25%) at 850° C. to achieve a specific surface area of 1696 $m^2/g$, to obtain a primary activation-treated activated carbon. Thereafter, the activated carbon was acid-washed with hydrochloric acid (concentration: 0.5 N, diluent: ion-exchanged water) at a temperature of 85° C. for 30 minutes. Subsequently, in order to remove the residual acid, the activated carbon was sufficiently washed with ion-exchanged water, and dried, to obtain a primary activation-treated washed activated carbon having a potassium element content of 18 ppm. The primary activation-treated washed activated carbon was then subjected to secondary activation using propane combustion gas (steam partial pressure: 15%) at 950° C., to obtain a secondary activation-treated activated carbon having a specific surface area of 2210 $m^2/g$. The resulting secondary activation-treated activated carbon was subjected to alkali washing using an aqueous solution of sodium hydroxide (concentration: 1 N, diluent: ion-exchanged water) at 100° C. for 30 minutes. Subsequently, in order to remove the residual base, the activated carbon was sufficiently washed with ion-exchanged water. The activated carbon was then subjected to acid washing using hydrochloric acid (concentration: 1 N, diluent: ion-exchanged water) at a temperature of 100° C. for 30 minutes. Subsequently, the activated carbon was sufficiently washed with ion-exchanged water, and dried, followed by carrying out heat treatment under an atmosphere of nitrogen+steam (steam partial pressure: 3%) at 700° C. for 60 minutes to remove the residual acid, to thereby obtain an activation-treated alkali- and acid-washed activated carbon. The resulting activation-treated alkali- and acid-washed activated carbon was heated from room temperature to 1200° C. under nitrogen gas flow (heating rate: from room temperature to 600° C.; 10° C./minute, from 600 to 900° C.; 5° C./minute, from 900° C. to 1100° C.; 2.5° C./minute, from 1100° C. to 1200° C.; 2° C./minute), and subjected to heat treatment at 1200° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Example 9

The same char as in Example 1 was subjected to activation using propane combustion gas+steam (steam partial pressure: 15%) at 900° C., to obtain a primary activation-treated activated carbon having a specific surface area of 1905 $m^2/g$. The resulting primary activation-treated activated carbon was washed using an aqueous solution of sodium hydroxide (concentration: 1 N, diluent: ion-exchanged water) at 100° C. for 30 minutes. Subsequently, in order to remove the residual base, the activated carbon was sufficiently washed with ion-exchanged water. The activated carbon was then washed using hydrochloric acid (concentration: 1 N, diluent: ion-exchanged water) at a temperature of 100° C. for 30 minutes. Subsequently, the activated carbon was sufficiently washed with ion-exchanged water, and dried, followed by carrying out heat treatment under an atmosphere of nitrogen gas+steam (steam partial pressure: 3%) at 700° C. for 60 minutes to remove the residual acid, to thereby obtain an alkali- and acid-washed activated carbon. The resulting alkali- and acid-washed activated carbon was heated from room temperature to 1200° C. under nitrogen gas flow (heating rate: from room temperature to 600° C.; 10° C./minute, from 600 to 900° C.; 5° C./minute, from 900° C. to 1100° C.; 2.5° C./minute, from 1100° C. to 1200° C.; 2° C./minute), and subjected to heat treatment at 1200° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Comparative Example 1

A secondary activation-treated activated carbon obtained in the same manner as in Example 1 was subjected to acid washing using hydrochloric acid (concentration: 1 N, diluent: ion-exchanged water) at a temperature of 100° C. for 30 minutes. Subsequently, the activated carbon was sufficiently washed with ion-exchanged water, and dried, followed by carrying out heat treatment under an atmosphere of nitrogen gas+steam (steam partial pressure: 3%) at 700° C. for 60 minutes to remove the residual acid, to thereby obtain an acid-washed activated carbon. The activated carbon was then pulverized to an average particle size of 6 μm, to obtain a carbonaceous material for a capacitor electrode. The treatment conditions, and the physical properties of the obtained carbonaceous material were as shown in Table 1.

Comparative Example 2

An acid-washed activated carbon obtained in the same manner as in Comparative Example 1 was heated from room temperature to 1000° C. under nitrogen gas flow (heating rate: from room temperature to 600° C.; 10° C./minute, from 600 to 900° C.; 5° C./minute, from 900° C. to 1000° C.; 2.5° C./minute), and subjected to heat treatment at 1000° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Comparative Example 3

An acid-washed activated carbon obtained in the same manner as in Comparative Example 1 was heated from room temperature to 1100° C. under nitrogen gas flow (heating rate: from room temperature to 600° C.; 10° C./minute, from 600 to 900° C.; 5° C./minute, from 900° C. to 1100° C.; 2.5° C./minute), and subjected to heat treatment at 1100° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Comparative Example 4

An acid-washed activated carbon obtained in the same manner as in Comparative Example 1 was heated from room temperature to 1200° C. under nitrogen gas flow (heating rate: from room temperature to 600° C.; 10° C./minute, from 600 to 900° C.; 5° C./minute, from 900° C. to 1100° C.; 2.5° C./minute, from 1100° C. to 1200° C.; 2° C./minute), and subjected to heat treatment at 1200° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Comparative Example 5

An alkali- and acid-washed activated carbon obtained in the same manner as in Example 1 was pulverized to an average particle size of 6 μm, to obtain a carbonaceous material for a capacitor electrode. The treatment conditions, and the physical properties of the obtained carbonaceous material were as shown in Table 1.

Comparative Example 6

An alkali- and acid-washed activated carbon obtained in the same manner as in Example 1 was heated from room temperature to 1400° C. under nitrogen gas flow (heating rate: from room temperature to 600° C.; 10° C./minute, from 600 to 900° C.; 5° C./minute, from 900° C. to 1100° C.; 2.5° C./minute, from 1100° C. to 1400° C.; 2° C./minute), and subjected to heat treatment at 1400° C. for 60 minutes, followed by pulverization to an average particle size of 6 μm, to obtain a carbonaceous material for a capacitor electrode. The treatment conditions, and the physical properties of the obtained carbonaceous material were as shown in Table 1.

Comparative Example 7

A carbonaceous material for a capacitor electrode was obtained by the same operation as in Example 7 except that the temperature for the washing with the aqueous solution of sodium hydroxide was 25° C. The treatment conditions, and the physical properties of the obtained carbonaceous material were as shown in Table 1.

Comparative Example 8

A carbonaceous material for a capacitor electrode was obtained by the same operation as in Example 7 except that the temperature for the washing with the aqueous solution of sodium hydroxide was 60° C. The treatment conditions, and the physical properties of the obtained carbonaceous material were as shown in Table 1.

Comparative Example 9

An alkali- and acid-washed activated carbon obtained in the same manner as in Example 1 was pulverized to an average particle size of 6 μm, and then heated from room temperature to 1000° C. under nitrogen gas flow (heating rate: from room temperature to 600° C.; 10° C./minute, from 600 to 900° C.; 5° C./minute, from 900° C. to 1000° C.; 2.5° C./minute), followed by carrying out heat treatment at 1000° C. for 60 minutes, to obtain a carbonaceous material for a capacitor electrode. The treatment conditions, and the physical properties of the obtained carbonaceous material were as shown in Table 1.

Comparative Example 10

The same char as in Example 1 was subjected to activation using propane combustion gas+steam (steam partial pressure: 25%) at 900° C., to obtain a primary activation-treated activated carbon having a specific surface area of 1630 $m^2/g$. The primary activation-treated activated carbon obtained was subjected to acid washing using hydrochloric acid (concentration: 1 N, diluent: ion-exchanged water) at a temperature of 100° C. for 30 minutes. Subsequently, the activated carbon was sufficiently washed with ion-exchanged water, and dried, followed by carrying out heat treatment under an atmosphere of nitrogen gas+steam (steam partial pressure: 3%) at 700° C. for 60 minutes to remove the residual acid, to thereby obtain an acid-washed activated carbon. The activated carbon was then pulverized to an average particle size of 6 μm, to obtain a carbonaceous material for a capacitor electrode. The treatment conditions, and the physical properties of the obtained carbonaceous material were as shown in Table 1.

TABLE 1

| | Alkali washing | | | | | | | | | | Impurities | |
|---|---|---|---|---|---|---|---|---|---|---|---|---|
| Example No. | Alkali used | Concentration N | Temperature ° C. | Time min | Heat treatment temperature ° C. | Powder conductivity S/cm | Surface functional groups meq/g | Specific surface area $m^2/g$ | MP pores $cm^3/g$ | BJH pores (4 nm or larger) $cm^3/g$ | Si ppm | Na + K ppm |
| Example 1 | NaOH | 1 | 100 | 30 | 1000 | 10.9 | 0.28 | 1632 | 0.70 | 0.168 | 5 | 6 |
| Example 2 | NaOH | 1 | 100 | 30 | 1100 | 14.0 | 0.30 | 1587 | 0.68 | 0.151 | 11 | 5 |
| Example 3 | NaOH | 1 | 100 | 30 | 1200 | 18.0 | 0.27 | 1534 | 0.66 | 0.146 | 20 | 8 |
| Example 4 | NaOH | 1 | 100 | 30 | 1300 | 20.7 | 0.25 | 1461 | 0.62 | 0.157 | 19 | 4 |
| Example 5 | NaOH | 0.05 | 100 | 30 | 1100 | 13.9 | 0.30 | 1587 | 0.68 | 0.152 | 15 | 5 |
| Example 6 | NaOH | 1 | 100 | 10 | 1100 | 13.7 | 0.30 | 1577 | 0.68 | 0.147 | 90 | 10 |
| Example 7 | NaOH | 1 | 70 | 30 | 1100 | 13.6 | 0.29 | 1588 | 0.67 | 0.155 | 99 | 8 |
| Example 8 | NaOH | 1 | 100 | 30 | 1200 | 15.1 | 0.34 | 2107 | 1.07 | 0.131 | 20 | 2 |
| Example 9 | NaOH | 1 | 100 | 30 | 1200 | 16.0 | 0.33 | 1763 | 0.79 | 0.109 | 12 | 12 |
| Comparative Example 1 | — | — | — | — | — | 9.1 | 0.32 | 1658 | 0.71 | 0.157 | 255 | 42 |
| Comparative Example 2 | — | — | — | — | 1000 | 11.0 | 0.27 | 1648 | 0.71 | 0.152 | 299 | 45 |
| Comparative Example 3 | — | — | — | — | 1100 | 13.6 | 0.28 | 1566 | 0.68 | 0.163 | 303 | 44 |
| Comparative Example 4 | — | — | — | — | 1200 | 17.6 | 0.27 | 1526 | 0.66 | 0.166 | 330 | 40 |
| Comparative Example 5 | NaOH | 1 | 100 | 30 | — | 9.3 | 0.38 | 1698 | 0.73 | 0.174 | 27 | 5 |
| Comparative Example 6 | NaOH | 1 | 100 | 30 | 1400 | 22.3 | 0.22 | 1410 | 0.59 | 0.157 | 21 | 5 |
| Comparative Example 7 | NaOH | 1 | 25 | 30 | 1100 | 14.0 | 0.29 | 1575 | 0.68 | 0.155 | 295 | 25 |
| Comparative Example 8 | NaOH | 1 | 60 | 30 | 1100 | 13.6 | 0.29 | 1588 | 0.66 | 0.151 | 201 | 20 |
| Comparative Example 9 | NaOH | 1 | 100 | 30 | 1000 | 11.8 | 0.20 | 1612 | 0.69 | 0.133 | 10 | 0 |
| Comparative Example 10 | — | — | — | — | — | 8.5 | 0.38 | 1612 | 0.69 | 0.097 | 393 | 11 |

<Preparation of Test Electrode>

A carbonaceous material (an electrode active material for an electric double-layer capacitor), a conductivity aid, and a binder as electrode constituent members were preliminarily dried under reduced pressure in an atmosphere at 120° C. at a reduced pressure (not more than 0.1 kPa) for not less than 16 hours before use.

The carbonaceous material, the conductivity aid, and the binder were weighed, and 0.81 g, 0.09 g, and 0.1 g of these, respectively, were kneaded together. As the conductivity aid, the conductive carbon black "DENKA BLACK Granules" manufactured by Denka Company Limited was used, and, as the binder, the polytetrafluoroethylene "6J" manufactured by Mitsui-DuPont Fluorochemicals Co., Ltd. was used. For further homogenization, the kneaded product was cut into flakes having a size of 1 mm×1 mm or smaller, and a pressure of 400 kg/cm$^2$ was applied thereto using a coin molding machine, to obtain a coin-shaped secondary molded article. The obtained secondary molded article was molded into the shape of a sheet having a thickness of 160 μm±5% (8 μm) using a roll press machine, and then cut out into a predetermined size (30 mm×30 mm), to prepare an electrode composition 1 illustrated in FIG. 1. The obtained electrode composition 1 was dried at 120° C. under a reduced-pressure atmosphere for not less than 16 hours. Thereafter, the mass, sheet thickness, and dimensions of the composition were measured, and the composition was used for the following measurement.

<Preparation of Measurement Electrode Cell>

Figure 2:
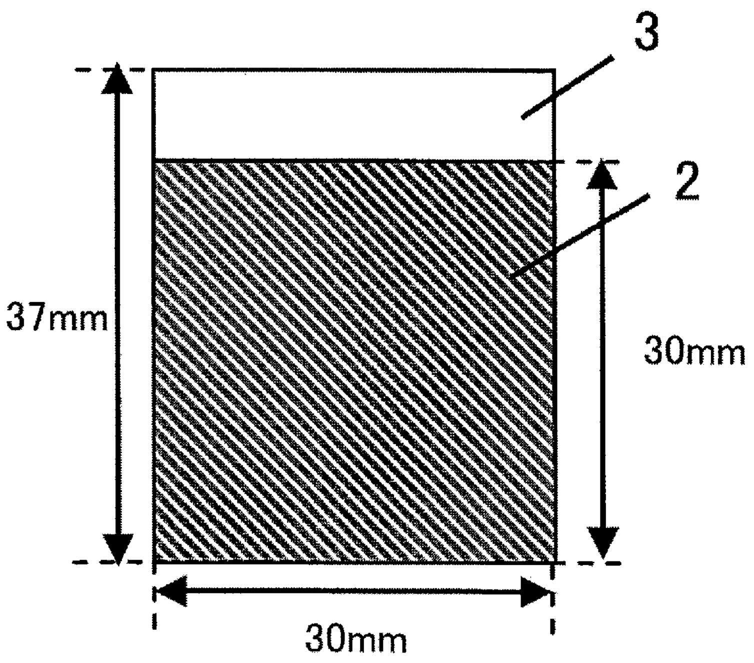
FIG. 2 is a diagram illustrating a current collector (etching aluminum foil) to which a conductive adhesive is applied.
Figure 3:
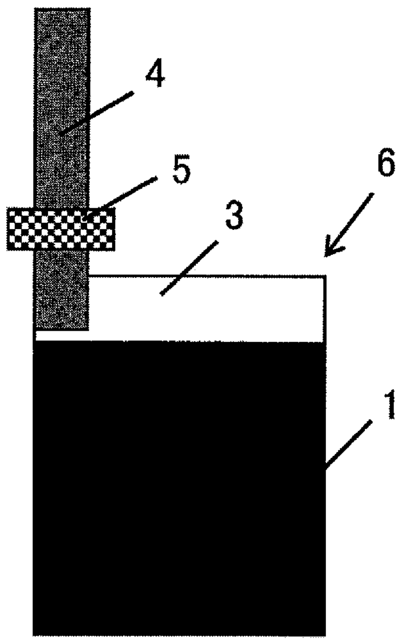
FIG. 3 is a diagram illustrating a polarizable electrode in which a sheet-shaped electrode composition is adhered to a current collector, and in which an aluminum tab is attached by ultrasonic welding.

As illustrated in FIG. 2, a conductive adhesive 2 "HITASOL GA-703" manufactured by Hitachi Chemical Co., Ltd. was applied to an etching aluminum foil 3 manufactured by Hohsen Corp., to a coating thickness of 100 μm. Subsequently, as illustrated in FIG. 3, the etching aluminum foil 3 coated with the conductive adhesive 2 was adhered to the sheet-shaped electrode composition 1 that had been cut in advance. Subsequently, an aluminum tab 4 having a sealant 5 manufactured by Hohsen Corp. was welded to the etching aluminum foil 3 using an ultrasonic welding machine. Thereafter, the resulting product was dried under vacuum at 120° C. to obtain a polarizable electrode 6 equipped with an aluminum current collector.

Figure 4:
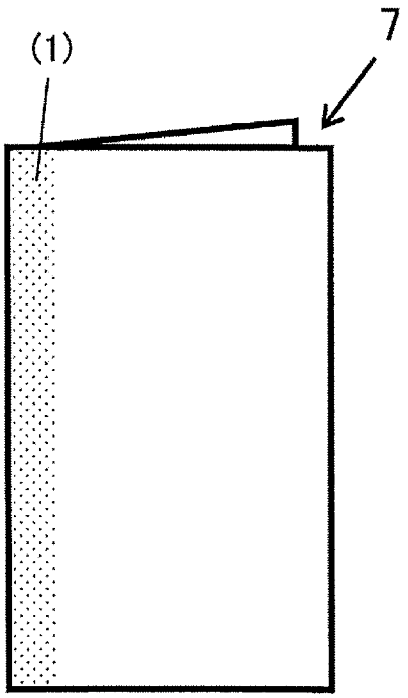
FIG. 4 is a diagram illustrating a bag-shaped exterior sheet.
Figure 5:
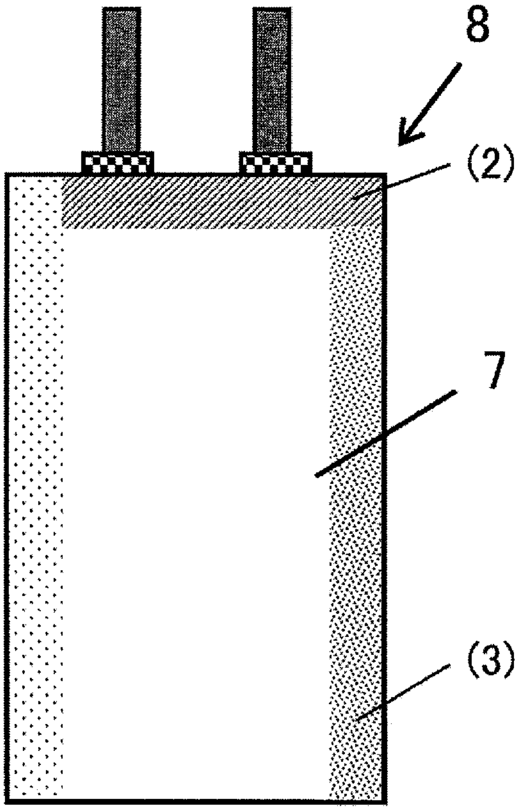
FIG. 5 is a diagram illustrating an electric double-layer capacitor.

As illustrated in FIG. 4, an aluminum-laminated resin sheet manufactured by Hohsen Corp. was cut out into a rectangular shape (200 mm (length)×60 mm (width)), and folded in half. One side ((1) in FIG. 4) of the resulting product was bonded by hot pressing to provide a bag-shaped exterior sheet 7 whose two remaining sides are open. Two pieces of the polarizable electrode 6 described above were layered on each other via a cellulose separator "TF-40" (not illustrated) manufactured by Nippon Kodoshi Corporation, to prepare a laminate. The laminate was inserted into the exterior sheet 7, and the polarizable electrodes 6 were immobilized by bonding, by hot pressing, of the side in contact with the tabs 4 ((2) in FIG. 5). Subsequently, the resulting product was vacuum-dried at 120° C. in an atmosphere under reduced pressure for not less than 16 hours, and an electrolyte was injected thereto in a dry box with an argon atmosphere (dew point, not more than −90° C.). As the electrolyte, a solution of 1.0 mol/L of tetraethylammonium tetrafluoroborate in acetonitrile, manufactured by Kishida Chemical Co., Ltd. was used. The laminate was impregnated with the electrolyte in the exterior sheet 7, and then the remaining one side ((3) in FIG. 5) of the exterior sheet 7 was bonded by hot pressing, to prepare the electric double-layer capacitor 8 illustrated in FIG. 5.

<Measurement of Capacitance>

Using the "CAPACITOR TESTER PFX2411" manufactured by Kikusui Electronics Corp., the obtained electric double-layer capacitor 8 was charged with a constant current of 50 mA per electrode surface area at 25° C. or −30° C. until the voltage reached 3.0 V. Subsequently, auxiliary charging was carried out under a constant voltage of 3.0 V for 30 minutes. After the completion of the auxiliary charging, discharge was allowed at 25 mA. From the obtained discharge curve data, the capacitance (F) was calculated by the energy conversion method. More specifically, after the charge, the discharge was allowed until the voltage decreased to zero, and the capacitance (F) was calculated from the discharge energy observed upon this discharge. By dividing the calculated value by the electrode volume, the capacitance (F/cc) was determined. The results are shown in Table 2.

<Measurement of Amount of Gas Generated>

After the measurement of the capacitance described above, the cell was retained for 600 hours in a thermostat at 60° C. while a voltage of 3.0 V was applied thereto. The dry weight, and the weight in water, of the measurement electrode cell were measured, and the cell volume was calculated from the buoyancy generated and the density of the water. The amount of gas in terms of the volume was calculated from the change in the cell volume caused by the durability test, and then the amount was corrected for the difference in the temperature between the measurements. More specifically, the amount of gas generated was calculated according to the following equation. In the equation, the cell weight A represents the cell weight (g) in air, and the cell weight W represents the cell weight (g) in water.

$$\text{Amount of gas generated}(cc)=\{(\text{Cell weight } A \text{ after durability test}-\text{Cell weight } W \text{ after durability test})-(\text{Cell weight } A \text{ before durability test}-\text{Cell weight } W \text{ before durability test})\}/(273+\text{Measured temperature after durability test } (^\circ\text{ C.}))/(273+\text{Measured temperature before durability test } (^\circ\text{ C.}))$$

The amount of gas generated was further divided by the mass of the activated carbon constituting the electrode composition, to determine the amount of gas generated per mass of the activated carbon (cc/g). The results are shown in Table 2.

<Moldability>

The number of sheets of the electrode composition 1 obtained in the preparation of the test electrode using 0.81 g, 0.09 g, and 0.1 g of the carbonaceous material, the conductivity aid, and the binder, respectively, was defined as the moldability. The results are shown in Table 2.

TABLE 2

| Example No. | Initial capacitance F/cc | Gas generation cc/g | Molded number Sheets |
|---|---|---|---|
| Example 1 | 14.4 | 11.3 | 3 |
| Example 2 | 14.4 | 8.1 | 3 |
| Example 3 | 14.0 | 7.4 | 3 |
| Example 4 | 13.0 | 7.1 | 3 |
| Example 5 | 14.3 | 8.3 | 3 |
| Example 6 | 14.4 | 9.3 | 3 |
| Example 7 | 14.4 | 9.6 | 3 |
| Example 8 | 12.9 | 9.5 | 3 |
| Example 9 | 14.4 | 10.9 | 3 |
| Comparative Example 1 | 14.6 | 24.1 | 3 |
| Comparative Example 2 | 14.4 | 17.1 | 3 |
| Comparative Example 3 | 14.4 | 15.5 | 3 |
| Comparative Example 4 | 14.1 | 12.1 | 3 |
| Comparative Example 5 | 14.4 | 16.3 | 3 |
| Comparative Example 6 | 10.1 | 6.0 | 2 |

TABLE 2-continued

| Example No. | Initial capacitance F/cc | Gas generation cc/g | Molded number Sheets |
|---|---|---|---|
| Comparative Example 7 | 14.4 | 15.4 | 3 |
| Comparative Example 8 | 14.4 | 12.5 | 3 |
| Comparative Example 9 | — | — | 0 |
| Comparative Example 10 | 15.6 | 29.5 | 3 |

It can be seen that the carbonaceous materials obtained in Examples 1 to 9 have excellent moldability, and that the electric double-layer capacitors comprising the electrodes for an electric double-layer capacitor, prepared from these carbonaceous materials show decreased amounts of gas generated and high initial capacitances. On the other hand, it can be seen that the carbonaceous material obtained in Comparative Example 9 has poor moldability, that the electric double-layer capacitor comprising the electrode prepared from the carbonaceous material obtained in Comparative Example 6 has a low initial capacitance, and that the electric double-layer capacitors comprising the electrodes prepared from the carbonaceous materials obtained in the other Comparative Examples show increased amounts of gas generated.

DESCRIPTION OF SYMBOLS

1. Electrode composition
2. Conductive adhesive
3. Etching aluminum foil
4. Tab
5. Sealant
6. Polarizable electrode
7. Bag-shaped exterior sheet
8. Electric double-layer capacitor
(1) Side bonded by hot pressing
(2) Side in contact with tabs
(3) Remaining side of the bag-shaped exterior sheet

The invention claimed is:

1. A carbonaceous material, comprising activated carbon as a main component and having a silicon element content of less than 200 ppm, a powder conductivity of 10.0 to 22.0 S/cm, a total amount of surface functional groups of 0.22 to 0.36 meq/g, and a pore volume of 0.10 to 0.157 $cm^3/g$ in terms of pores having a pore size of not less than 4 nm as measured by a BJH method.

2. The carbonaceous material according to claim 1, having a BET specific surface area of 1400 to 2200 $m^2/g$.

3. The carbonaceous material according to claim 1, having an alkali metal content of less than 40 ppm.

4. The carbonaceous material according to claim 1, which is based on a plant-derived carbon precursor.

5. The carbonaceous material according to claim 4, wherein the plant-derived carbon precursor is coconut shell.

6. The carbonaceous material according to claim 1, having a pore volume of 0.60 to 1.20 $cm^3/g$ in terms of pores having a pore size of less than 2 nm as measured by an MP method.

7. The carbonaceous material according to claim 1, having an average particle size of 1 to 15 μm.

8. An electrode active material for an electric double-layer capacitor, the electrode active material comprising the carbonaceous material according to claim 1.

9. An electrode for an electric double-layer capacitor, the electrode comprising the electrode active material according to claim 8.

10. An electric double-layer capacitor comprising the electrode according to claim 9.

11. A method of producing the carbonaceous material according to claim 1, the method comprising:

carbonizing, and then activating a carbon precursor to obtain an activated carbon, washing the activated carbon in an alkaline solution at not less than 65° C. to obtain an alkali-washed activated carbon, subjecting the alkali-washed activated carbon to acid washing to obtain an alkali- and acid-washed activated carbon, and subjecting the alkali- and acid-washed activated carbon to a heat treatment at 1000 to 1300° C. under an inert gas atmosphere, followed by pulverization.

* * * * *